United States Patent
Fukuno et al.

(10) Patent No.: US 12,015,266 B2
(45) Date of Patent: Jun. 18, 2024

(54) DC DISTRIBUTION PANEL

(71) Applicant: Mitsubishi Electric Corporation, Tokyo (JP)

(72) Inventors: Kenichi Fukuno, Tokyo (JP); Takushi Jimichi, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 308 days.

(21) Appl. No.: 17/600,868

(22) PCT Filed: Jul. 11, 2019

(86) PCT No.: PCT/JP2019/027561
§ 371 (c)(1),
(2) Date: Oct. 1, 2021

(87) PCT Pub. No.: WO2021/005793
PCT Pub. Date: Jan. 14, 2021

(65) Prior Publication Data
US 2022/0190592 A1 Jun. 16, 2022

(51) Int. Cl.
*H02H 7/22* (2006.01)
*H02H 1/00* (2006.01)
*H02H 9/00* (2006.01)

(52) U.S. Cl.
CPC .......... *H02H 7/22* (2013.01); *H02H 1/0007* (2013.01); *H02H 9/001* (2013.01)

(58) Field of Classification Search
CPC .......... H02H 9/00; H02H 9/001; H02H 9/02; H02H 3/087; H02H 3/18; H02H 7/22; H02H 1/00
(Continued)

(56) References Cited

U.S. PATENT DOCUMENTS 5,726,505 A * 3/1998 Yamada ............... H02J 7/0031
361/84
2005/0083715 A1 4/2005 Guillarme et al.
(Continued)

FOREIGN PATENT DOCUMENTS

EP 3925072 A1 12/2021
JP H097473 A 1/1997
(Continued)

OTHER PUBLICATIONS

International Search Report (PCT/ISA/210) with translation and Written Opinion (PCT/ISA/237) dated Sep. 24, 2019, by the Japan Patent Office as the International Searching Authority for International Application No. PCT/JP2019/027561. (9 pages).
(Continued)

*Primary Examiner* — Tuan T Dinh
(74) *Attorney, Agent, or Firm* — BUCHANAN INGERSOLL & ROONEY PC (57) ABSTRACT

An object is to provide a DC distribution panel that, even when short-circuit current has occurred in one feeder, interrupts only the feeder where short-circuit current has occurred, and thus can continue operations of load apparatuses connected to normal feeders. This DC distribution panel includes: an input terminal including positive and negative input terminals; circuit breakers having short-circuit current interruption units connected to at least either of positive electric paths and negative electric paths respectively branched from the positive and negative input terminals; and output terminals including positive output terminals and negative output terminals of the plurality of circuit breakers. At least one of the plurality of circuit breakers
(Continued)

includes a reverse current interruption unit for interrupting reverse current flowing through the positive electric path from the output terminal side to the input terminal side.

15 Claims, 5 Drawing Sheets

(58) Field of Classification Search
USPC .................................... 361/93.1, 100–104
See application file for complete search history.

(56) References Cited

U.S. PATENT DOCUMENTS

| | | | |
|---|---|---|---|
| 2012/0099236 A1* | 4/2012 | Cyuzawa | H02J 1/06 |
| | | | 361/101 |
| 2013/0329329 A1 | 12/2013 | Liu et al. | |
| 2015/0280423 A1* | 10/2015 | Bremicker | H02M 3/155 |
| | | | 307/71 |
| 2016/0190791 A1 | 6/2016 | Sim | |
| 2016/0336734 A1 | 11/2016 | Lee et al. | |
| 2017/0288388 A1* | 10/2017 | Horinouchi | H01H 9/54 |
| 2021/0305980 A1* | 9/2021 | Sim | H02H 3/087 |
| 2022/0149610 A1 | 5/2022 | Beckert et al. | |

FOREIGN PATENT DOCUMENTS

| | | |
|---|---|---|
| JP | 2005528067 A | 9/2005 |
| JP | 2015011933 A | 1/2015 |
| JP | 2015015798 A | 1/2015 |
| JP | 2016127026 A | 7/2016 |
| JP | 2016213192 A | 12/2016 |
| WO | 2010150706 A1 | 12/2010 |
| WO | 2020193134 A1 | 10/2020 |

OTHER PUBLICATIONS

Extended European Search Report dated May 17, 2022, issued in corresponding European Patent Application No. 19936829.1, 7 pages.

Office Action dated Jun. 28, 2022, issued in corresponding Japanese Patent Application No. JP 2021-530461, 8 pages including 4 pages of English Translation.

First Office Action dated Mar. 27, 2024, issued in the corresponding Chinese Patent Application No. 201980098068.9, 12 pages including 4 pages of English Translation.

* cited by examiner

DC DISTRIBUTION PANEL

TECHNICAL FIELD

The present disclosure relates to a DC distribution panel.

BACKGROUND ART

A DC distribution panel is provided between load apparatuses and a rectification device of a DC power supply or the like, in a DC power distribution system. The DC distribution panel has a function of branching DC power inputted from the rectification device into a plurality of feeders and supplying power to the load apparatuses connected to the respective feeders. The DC distribution panel may be provided with a plurality of circuit breakers corresponding to the plurality of feeders in order to prevent flowing of large short-circuit current when a failure such as short-circuit has occurred in the load apparatus.

One conventional example of such DC distribution panels includes a plurality of semiconductor circuit breakers provided correspondingly for respective feeders, circuit breaker capacitors provided near the semiconductor circuit breakers, and a distribution panel capacitor connected in parallel with the semiconductor circuit breakers (see, for example, Patent Document 1).

In the conventional DC distribution panel, when short-circuit current flows through the feeder due to short-circuit in the load apparatus, the semiconductor circuit breaker is turned off, whereby the short-circuit current can be interrupted. In addition, since the conventional DC distribution panel has the circuit breaker capacitor, it is possible to inhibit application of overvoltage to the semiconductor circuit breaker due to short-circuit of the load apparatus.

CITATION LIST

Patent Document

Patent Document 1: Japanese Laid-Open Patent Publication No. 2015-15798

SUMMARY OF THE INVENTION

Problems to be Solved by the Invention

In the DC distribution panel, the load apparatuses are connected to the plurality of feeders on the output side. When short-circuit has occurred in one of the load apparatuses, reverse current might flow into the DC distribution panel from the feeder connected to the load apparatus where short-circuit has not occurred. If the reverse current flows into the DC distribution panel, the circuit breaker corresponding to the feeder where short-circuit has not occurred might perform an interruption operation. In the conventional DC distribution panel, short-circuit current of the feeder where short-circuit has occurred can be interrupted, but the reverse current from the feeder where short-circuit has not occurred cannot be interrupted. As a result, in the conventional DC distribution panel, there is a problem that the feeder where short-circuit has not occurred, i.e., the normal feeder is also interrupted.

The present disclosure has been made to solve the above problem, and an object of the present disclosure is to provide a DC distribution panel that, even when short-circuit current has occurred in one feeder, interrupts only the feeder where short-circuit current has occurred, and thus can continue operations of load apparatuses connected to normal feeders.

Solution to the Problems

A DC distribution panel according to the present disclosure includes: an input terminal including a positive input terminal and a negative input terminal; a plurality of circuit breakers having short-circuit current interruption units provided to at least either of positive electric paths and negative electric paths respectively branched from the positive input terminal and the negative input terminal; and output terminals including positive output terminals and negative output terminals of the plurality of circuit breakers. Further, in the DC distribution panel according to the present disclosure, at least one of the plurality of circuit breakers includes a reverse current interruption unit for interrupting reverse current flowing through the positive electric path from the output terminal side to the input terminal side.

Effect of the Invention

In the DC distribution panel according to the present disclosure, at least one of the plurality of circuit breakers includes the reverse current interruption unit for interrupting reverse current flowing through the positive electric path from the output terminal side to the input terminal side. Thus, only the feeder where short-circuit current has occurred is interrupted, and operations of the load apparatuses connected to normal feeders can be continued.

DESCRIPTION OF EMBODIMENTS

Hereinafter, a DC distribution panel according to embodiments for carrying out the present disclosure will be described in detail with reference to the drawings. In the drawings, the same reference characters denote the same or corresponding parts.

Embodiment 1

Figure 1:
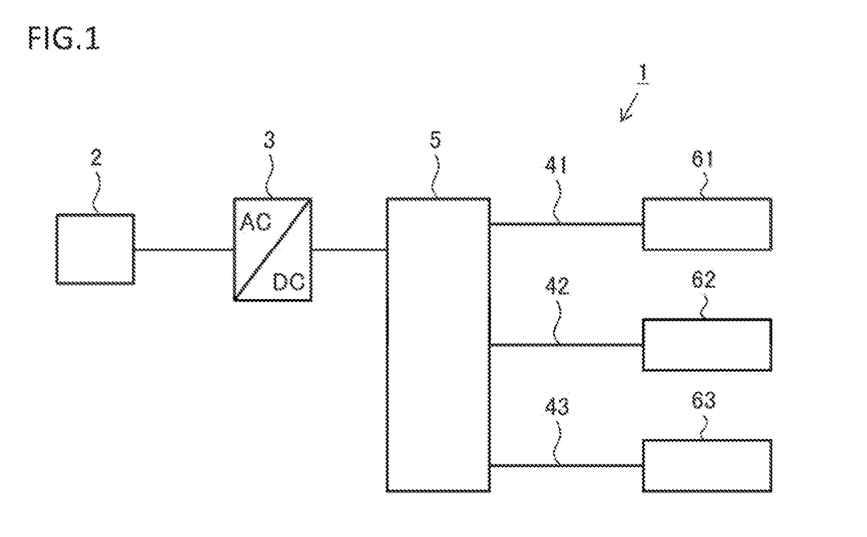
FIG. 1 is a schematic diagram of a DC power distribution system to which a DC distribution panel is applied according to embodiment 1.

FIG. 1 is a schematic diagram of a DC power distribution system to which a DC distribution panel is applied according to embodiment 1. A DC power distribution system 1 of the present embodiment is composed of an AC/DC converter 3 for converting AC power outputted from an AC power supply 2 to DC power, a DC distribution panel 5 for distributing the converted DC power to three systems of feeders 41, 42, and 43, and load apparatuses 61, 62, and 63 connected to the feeders 41, 42, and 43. In the DC power distribution system 1 shown in FIG. 1, one AC/DC converter 3 is provided. However, for the purpose of improving reliability or increasing the power capacity, two or more AC/DC converters may be used. In addition, although the feeders on the output side of the DC distribution panel 5 are three systems, two or more systems of feeders can be applied. The load apparatuses 61, 62, and 63 may be apparatuses driven by DC power, e.g., lighting equipment, air conditioning equipment, power generation equipment such as photovoltaic generation, or power storage equipment such as a battery.

Figure 2:
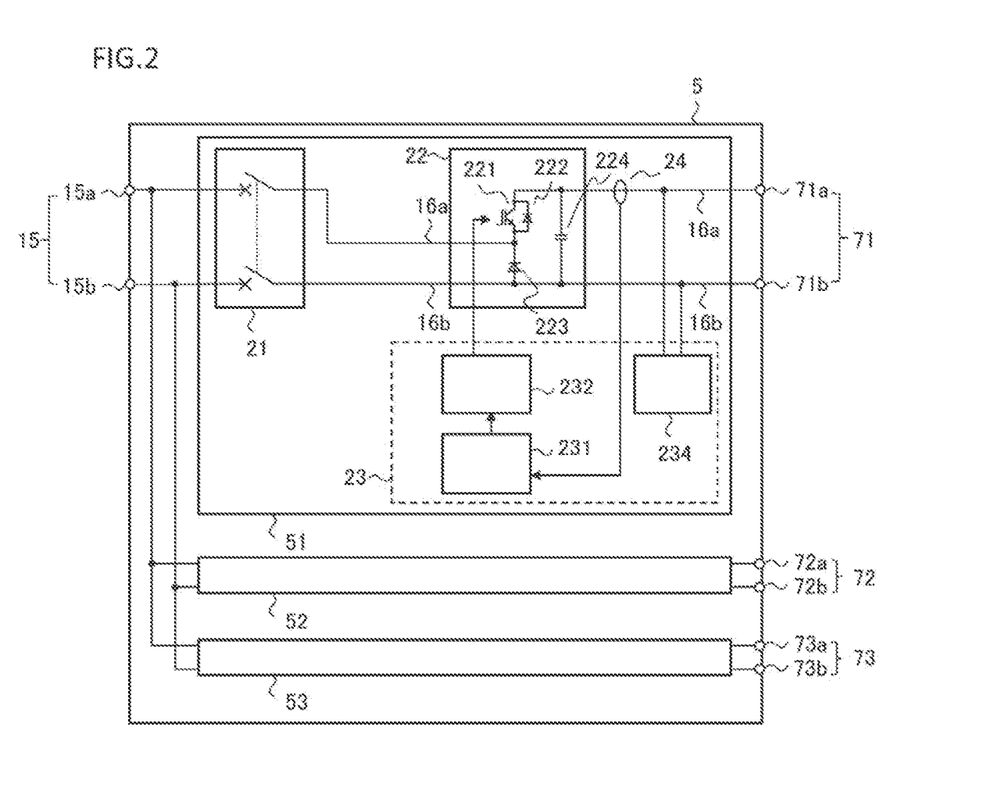
FIG. 2 is a schematic diagram of the DC distribution panel according to embodiment 1.

FIG. 2 is a schematic diagram of the DC distribution panel according to the present embodiment. The DC distribution panel 5 of the present embodiment includes an input terminal 15, circuit breakers 51, 52, and 53 respectively connected to branch electric paths branched from the input terminal 15 into three systems, and output terminals 71, 72, and 73 of the respective circuit breakers 51, 52, and 53. The input terminal 15 is composed of a positive input terminal 15a and a negative input terminal 15b. The output terminal 71 is composed of a positive output terminal 71a and a negative output terminal 71b. Similarly, the output terminal 72 is composed of a positive output terminal 72a and a negative output terminal 72b, and the output terminal 73 is composed of a positive output terminal 73a and a negative output terminal 73b.

The electric paths inside the DC distribution panel are branched from the input terminal 15 into three systems. The positive input terminal 15a is connected to the positive output terminal of the output terminal via a positive electric path 16a, and the negative input terminal 15b is connected to the negative output terminal of the output terminal via a negative electric path 16b.

As shown in FIG. 2, the circuit breaker 51 includes a short-circuit current interruption unit 21 and a reverse current interruption unit 22. The reverse current interruption unit 22 is connected to the output terminal side of the short-circuit current interruption unit 21. The short-circuit current interruption unit 21 has an interruption mechanism for interrupting the electric paths when excessive current flows through one or both of the positive electric path 16a and the negative electric path 16b, and as the interruption mechanism, for example, a mechanical-type interruption mechanism, a fuse, or the like can be used. The short-circuit current interruption unit 21 is provided for both of the positive electric path 16a and the negative electric path 16b, but may be provided for only one of them. The interruption mechanism of the short-circuit current interruption unit 21 is closed during a normal operation. When short-circuit has occurred in the feeder connected to the output terminal 71 of the circuit breaker 51, the interruption mechanism is opened, thus functioning to interrupt excessive short-circuit current. Hereinafter, using the reverse current interruption unit 22 as a boundary, input-terminal-side parts of the positive electric path 16a and the negative electric path 16b are referred to as an input-side positive electric path and an input-side negative electric path, and output-terminal-side parts thereof are referred to as an output-side positive electric path and an output-side negative electric path.

The reverse current interruption unit 22 includes a semiconductor switching element 221, a first diode 222 connected in antiparallel to the semiconductor switching element 221, a second diode 223 connected in series to the semiconductor switching element 221, and a capacitor 224 connected in parallel with the series connection of the semiconductor switching element 221 and the second diode 223. The emitter of the semiconductor switching element 221 is connected to the input-side positive electric path 16a, and the collector thereof is connected to the output-side positive electric path 16a. The cathode of the first diode 222 is connected to the output-side positive electric path 16a, and the anode thereof is connected to the input-side positive electric path 16a. The cathode of the second diode 223 is connected to the input-side positive electric path 16a, and the anode thereof is connected to the input-side negative electric path 16b. The capacitor 224 is connected between the output-side positive electric path 16a and the output-side negative electric path 16b.

The reverse current interruption unit 22 is controlled by a control circuit 23. The control circuit 23 includes a determination circuit 231 for determining whether or not reverse current has occurred on the basis of a current value detected by a current sensor 24, and a gate drive circuit 232 for turning off the semiconductor switching element 221 of the reverse current interruption unit 22 when the determination circuit 231 determines that reverse current has occurred. The current sensor 24 is provided at a position for detecting current flowing through the positive electric path 16a. The current sensor 24 may be provided at a position for detecting current flowing through the negative electric path 16b.

Although the configuration of the circuit breaker 51 has been described above, the other circuit breakers 52 and 53 connected to the corresponding ones of the branch electric paths branched into three systems from the input terminal 15 also have the same configuration as the circuit breaker 51.

Next, operation of the DC distribution panel 5 of the present embodiment will be described. First, a factor of occurrence of reverse current will be described.

Figure 3:
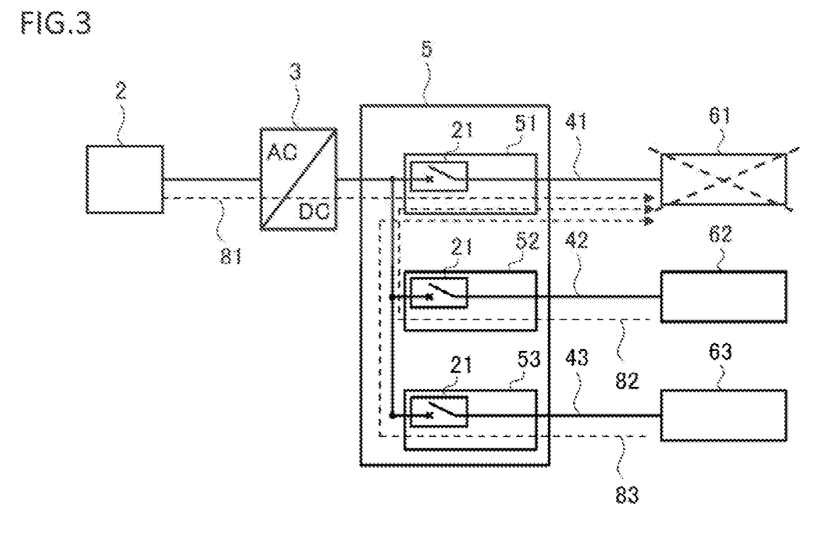
FIG. 3 is a schematic diagram of the DC power distribution system according to embodiment 1.
Figure 4:
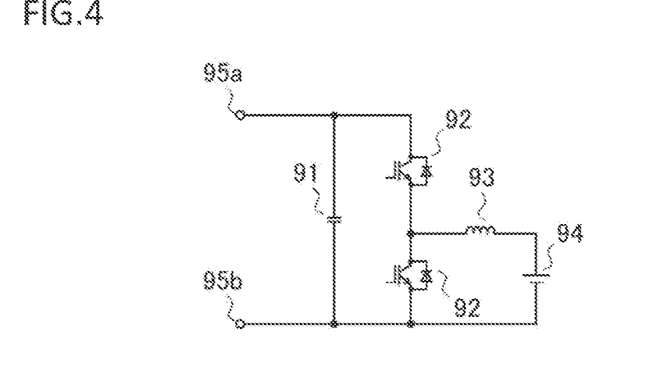
FIG. 4 is a configuration diagram of a load apparatus according to embodiment 1.

FIG. 3 is a schematic diagram of the DC power distribution system formed by the DC distribution panel in which each circuit breaker has only the short-circuit current interruption unit. FIG. 4 is a configuration diagram showing the configuration of power storage equipment as an example of a load apparatus. The DC power distribution system shown in FIG. 3 is composed of the AC/DC converter 3 for converting AC power to DC power, the DC distribution panel 5 having the circuit breakers 51, 52, and 53 each having only the short-circuit current interruption unit 21, and the load apparatuses 61, 62, and 63 respectively connected to the feeders 41, 42, and 43 of the output systems for the three circuit breakers. The power storage equipment shown in FIG. 4 is composed of a capacitor 91, two semiconductor switching elements 92 connected in parallel to the capacitor 91, and an inductance element 93 and a storage battery 94 which are connected to an intermediate point between the two semiconductor switching elements 92. Input terminals 95a and 95b at both ends of the capacitor 91 are respectively connected to the positive output terminal and the negative output terminal of the DC distribution panel. It is assumed that, in the DC power distribution system shown in FIG. 3, the power storage equipment shown in FIG. 4 is connected as the load apparatuses 61, 62, and 63.

In FIG. 3, it is assumed that the load apparatus 61 has failed and short-circuit has occurred. In this case, short-circuit current 81 flows from the AC power supply 2 through the AC/DC converter 3 and the DC distribution panel 5 to the load apparatus 61. The short-circuit current 81 becomes a factor of causing problems such as failure expansion in the load apparatus 61 and failure of the feeder 41. In order to prevent this, the short-circuit current is interrupted by the short-circuit current interruption unit 21 of the circuit breaker 51.

However, as shown in FIG. 3, due to sharp reduction in the impedance of the feeder 41 where the short-circuit has occurred, reverse currents 82 and 83 occur to flow from the capacitors 91 provided to the load apparatuses 62 and 63 that have not failed, through the insides of the circuit breakers 52 and 53 from the output terminal side to the input terminal side. The reverse currents 82 and 83 are superimposed on the short-circuit current 81, thus flowing to the feeder 41. Such current is also called sneak current. In a case where the reverse currents 82 and 83 are large, the reverse currents induce interruption in the short-circuit current interruption units 21 of the circuit breakers 52 and 53. As a result, supply of power to the feeders 42 and 43 connected to the load apparatuses 62 and 63 that have not failed is interrupted, so that the entire DC power distribution system is stopped.

In order to inhibit such sneak current, the DC distribution panel 5 of the present embodiment has the reverse current interruption unit. With reference to FIG. 2 and FIG. 3, operation of the DC distribution panel 5 of the present embodiment will be described. In each of the control circuits 23 of the circuit breakers 52 and 53 corresponding to the feeders 42 and 43 where short-circuit has not occurred, the determination circuit 231 determines whether or not excessive reverse current has occurred in the positive electric path 16a on the basis of the current value detected by the current sensor 24, and if it is determined that excessive reverse current has occurred, an off command is given to the gate drive circuit 232 to turn off the semiconductor switching element 221. In the DC distribution panel 5, the reverse currents caused in the feeders 42 and 43 can be interrupted by turning off the semiconductor switching elements 221. The determination circuit 231 has a current threshold stored in advance, and determines that excessive reverse current has occurred if the current value detected by the current sensor 24 is greater than the current threshold.

Further, in the DC distribution panel 5, even in a state in which the semiconductor switching elements 221 of the circuit breakers 52 and 53 are off, since the first diode 222 connected in antiparallel is present, the circuit breakers 52 and 53 readily allow supply of power from the AC power supply to the load apparatuses 62 and 63 after the feeder 41 where the short-circuit has occurred is interrupted by the short-circuit current interruption unit 21 of the circuit breaker 51.

In the DC distribution panel configured as described above, the reverse current interruption unit is provided for interrupting reverse current that flows through the positive electric path inside the circuit breaker from the output terminal side to the input terminal side. Thus, only the feeder where short-circuit current has occurred is interrupted, and operations of the load apparatuses connected to normal feeders can be continued.

Preferably, the current threshold for the determination circuit 231 is set to be smaller than the maximum current in a reverse bias safe operating area (RBSOA) of the semiconductor switching element 221. By this setting, failure of the semiconductor switching element 221 can be assuredly prevented.

As the semiconductor switching element 221, an insulated-gate bipolar transistor (IGBT), a gate commutated turn-off thyristor (GCT), a metal-oxide-semiconductor field-effect transistor (MOSFET), or the like may be used. It is noted that, during normal operation, current constantly flows through the semiconductor switching element 221, and therefore a unipolar element such as MOSFET, which exhibits small voltage drop, is preferable.

In the present embodiment, the current sensor 24 is provided at a position for detecting current flowing through the positive electric path 16a. The current sensor at this position directly detects reverse current flowing through the positive electric path from the output terminal side to the input terminal side. However, current proportional to the reverse current flowing through the positive electric path also flows through the negative electric path from the input terminal side to the output terminal side, and therefore, the current sensor may be provided at a position for detecting current flowing through the negative electric path 16b.

The second diode 223 is used for the purpose of stabilizing voltage across the semiconductor switching element 221 and the first diode 222, and therefore current hardly flows through the second diode 223, as compared to the semiconductor switching element 221. Therefore, the rated current of the second diode 223 may be smaller than the rated current of the semiconductor switching element 221 and the rated current of the first diode 222. Using the second diode having small rated current enables size reduction and cost reduction of the DC distribution panel.

Preferably, the control circuit 23 is provided with a control power supply 234 for supplying power to the current sensor 24, the determination circuit 231, and the gate drive circuit 232. As shown in FIG. 2, the control power supply 234 can obtain power from the output-side positive electric path and the output-side negative electric path.

In consideration of a case where power might not be supplied to the DC distribution panel, it is preferable that elements that can be cooled naturally by air without the need of power are used as the semiconductor switching element 221, the first diode 222, and the second diode 223.

Embodiment 2

Figure 5:
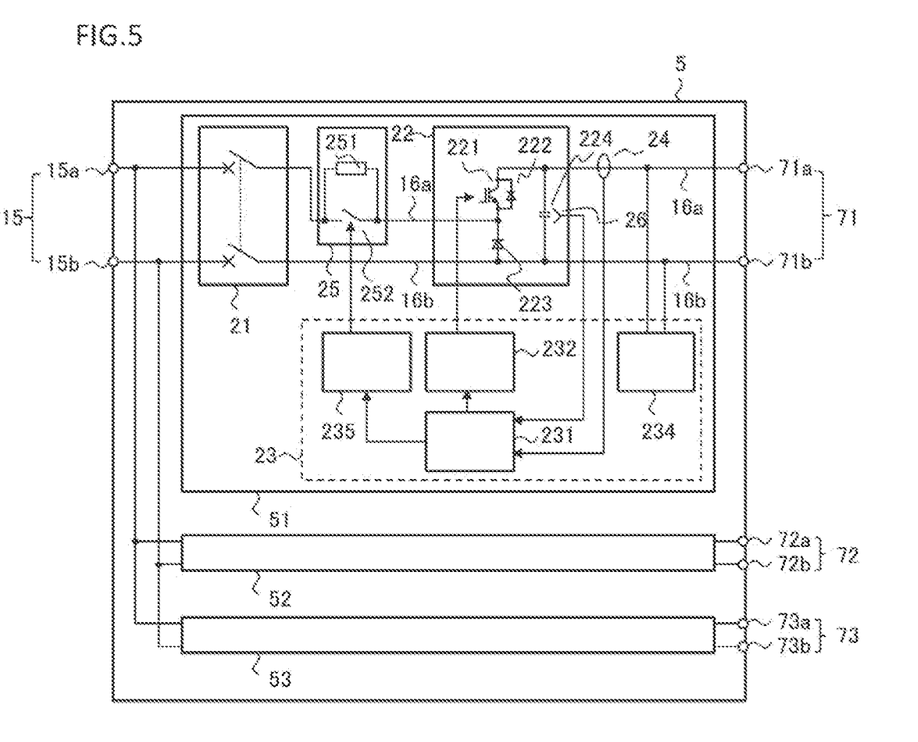
FIG. 5 is a schematic diagram of a DC distribution panel according to embodiment 2.

FIG. 5 is a schematic diagram of a DC distribution panel according to embodiment 2. The DC distribution panel of the present embodiment is configured such that an inrush current prevention unit is added to the DC distribution panel described in embodiment 1.

As shown in FIG. 4 in embodiment 1, a capacitor is present in the load apparatus. Further, the DC distribution panel has the capacitor 224 in the reverse current interruption unit 22. In a state in which the capacitor of the load apparatus or the capacitor of the DC distribution panel has no electric charge stored therein, e.g., in a state in which the DC distribution panel is initially connected to the AC/DC converter and output of DC power from the AC/DC converter is started, the capacitor is charged and thus excessive current might flow in the DC distribution panel in a short period of time. Such current is called inrush current. The inrush current can cause failure of the semiconductor switching element 221, the first diode 222, or the like of the reverse current interruption unit 22.

As shown in FIG. 5, the DC distribution panel 5 of the present embodiment has an inrush current prevention unit 25 provided on the positive electric path 16a between the short-circuit current interruption unit 21 and the reverse current interruption unit 22. In the inrush current prevention unit 25, a resistor 251 and a bypass switch 252 are connected in parallel to the positive electric path 16a. In addition, the DC distribution panel 5 has a voltage sensor 26 for measuring the charge voltage of the capacitor 224 of the reverse current interruption unit 22. The voltage sensor 26 outputs the charge voltage of the capacitor 224 to the determination circuit 231 of the control circuit 23. Further, the control circuit 23 has a switch drive circuit 235 for controlling opening/closing of the bypass switch 252. The switch drive circuit 235 is connected to the determination circuit 231. The determination circuit 231 determines whether or not charging of the capacitor 224 is completed on the basis of the detection value of the charge voltage of the capacitor 224 sent from the voltage sensor 26, and if it is determined that the charging is completed, the determination circuit 231 issues a command for closing the bypass switch 252, to the switch drive circuit 235.

Next, operation of the DC distribution panel will be described. When input of DC power is started in a state in which the bypass switch 252 of the inrush current prevention unit 25 is opened, current in the positive electric path 16a flows through the resistor 251 of the inrush current prevention unit 25, to charge the capacitor 224. The determination circuit 231 determines whether or not charging of the capacitor 224 is completed on the basis of the charge voltage of the capacitor 224 detected by the voltage sensor 26, and if it is determined that the charging is completed, the determination circuit 231 issues a command for closing the bypass switch 252, to the switch drive circuit 235. The switch drive circuit 235 closes the bypass switch 252. By such operation, inrush current when the capacitor is charged flows through the resistor 251, and thus the current value of the inrush current can be reduced.

In the DC distribution panel configured as described above, as in embodiment 1, the reverse current interruption unit is provided for interrupting reverse current that flows through the positive electric path inside the circuit breaker from the output terminal side to the input terminal side. Thus, only the feeder where short-circuit current has occurred is interrupted, and operations of the load apparatuses connected to normal feeders can be continued.

In addition, the DC distribution panel has the inrush current prevention unit, whereby the current value of inrush current that occurs when the capacitor is charged can be reduced. Thus, it is possible to avoid failure of the semiconductor switching element, the first diode, or the like due to excessive inrush current.

Here, the resistance value of the resistor 251 will be described. The resistance value of the resistor 251 is denoted by R, the rated current of the first diode 222 is denoted by Ir, and the charge voltage of the capacitor 224 is denoted by V. The charge voltage of the capacitor 224 also corresponds to the rated voltage of the feeder. In this case, it is preferable that the resistance value R of the resistor 251 satisfies the following expression.

$$R \geq V/Ir$$

In a case of using the resistor that satisfies the above expression, the value of current flowing through the first diode 222 becomes smaller than the rated current value of the first diode 222, and thus failure of the semiconductor switching element 221 and the first diode 222 can be assuredly prevented.

Preferably, the bypass switch 252 is opened in a non-operated state. Therefore, preferably, a normally-open switch is used.

In the present embodiment, the inrush current prevention unit is provided on the positive electric path. However, the inrush current prevention unit may be provided on the negative electric path.

Embodiment 3

Figure 6:
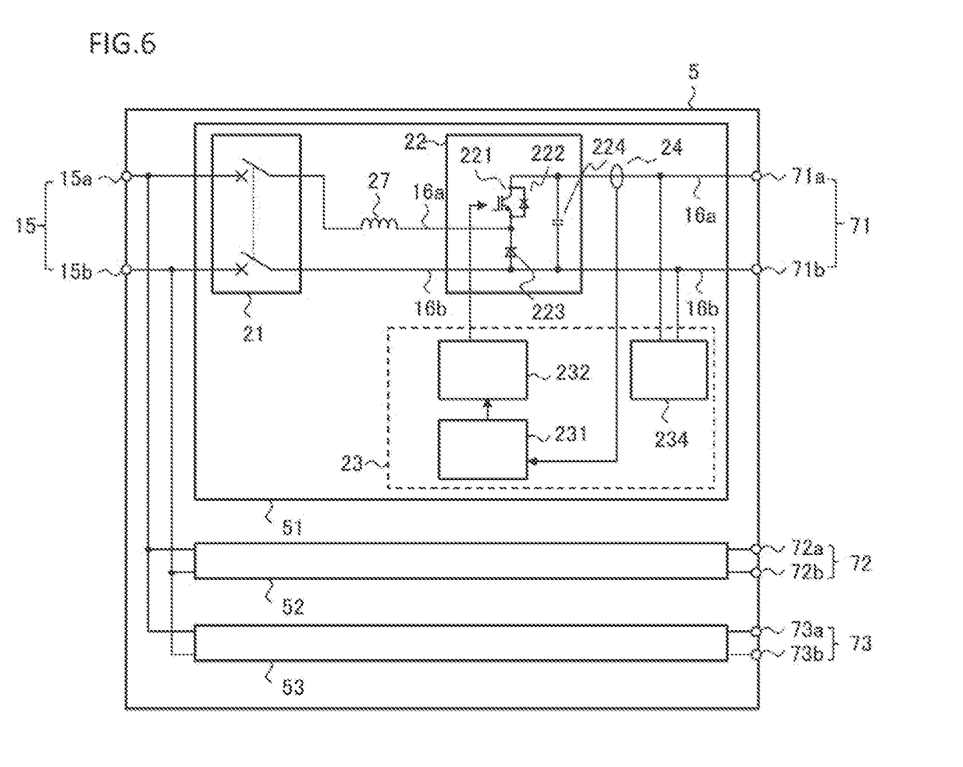
FIG. 6 is a schematic diagram of a DC distribution panel according to embodiment 3.

FIG. 6 is a schematic diagram of a DC distribution panel according to embodiment 3. The DC distribution panel of the present embodiment is configured such that an inductance element is added to the DC distribution panel described in embodiment 1.

As described in embodiment 1, in the control circuit 23, the determination circuit 231 determines whether or not excessive reverse current has occurred on the basis of the current value detected by the current sensor 24, and if it is determined that excessive reverse current has occurred, an off command is given to the gate drive circuit 232 to turn off the semiconductor switching element 221. However, in actuality, a delay time arises in the current sensor 24, the determination circuit 231, and the gate drive circuit 232, and therefore it is impossible to immediately turn off the semiconductor switching element 221. During the delay time, the reverse current increases. Where the rated voltage of the feeder is denoted by V, the inductance of the positive electric path inside the DC distribution panel is denoted by L, and the delay time is denoted by T, an increase amount ΔI of the reverse current can be represented by the following expression.

$$\Delta I = (V/L) \times T$$

Accordingly, in a case where the inductance of the electric path inside the DC distribution panel is small, ΔI becomes great and thus the reverse current immediately increases in a short period of time, so that the semiconductor switching element 221, the first diode 222, and the like might fail.

As shown in FIG. 6, the DC distribution panel of the present embodiment has an inductance element 27 provided on the positive electric path 16a between the short-circuit current interruption unit 21 and the reverse current interruption unit 22. The inductance of the positive electric path inside the DC distribution panel is made great by the inductance element 27. Since the inductance of the positive electric path inside the DC distribution panel is made great, the increase amount of the reverse current in the delay time is reduced. As the inductance element 27, for example, a coil or a tortuous electric path may be used.

In the DC distribution panel configured as described above, as in embodiment 1, the reverse current interruption unit is provided for interrupting reverse current that flows through the positive electric path inside the circuit breaker from the output terminal side to the input terminal side. Thus, only the feeder where short-circuit current has occurred is interrupted, and operations of the load apparatuses connected to normal feeders can be continued.

In addition, the DC distribution panel has the inductance element provided on the positive electric path therein, whereby the increase amount of the reverse current until the semiconductor switching element is turned off from when the reverse current has occurred can be reduced. Thus, it is possible to avoid failure of the semiconductor switching element, the first diode, or the like due to excessive inrush current.

Where the overcurrent setting value of the determination circuit 231 is denoted by Ioc and the maximum current in the reverse bias safe operating area (RBSOA) of the semiconductor switching element 221 is denoted by Imax, it is preferable that an inductance value L of the inductance element 27 satisfies the following expression. Here, the overcurrent setting value Ioc of the determination circuit 231 is set to a greater value than the rated current (the rated current in the regeneration direction) of the load apparatus in the direction of the reverse current.

$$L \geq (V/(I\max - Ioc)) \times T$$

In a case of using the inductance element that satisfies the above expression, it is ensured that the value of current flowing through the semiconductor switching element becomes smaller than the maximum current value in the reverse bias safe operating area of the semiconductor switching element, and thus failure of the semiconductor switching element 221 and the like can be prevented.

In the present embodiment, the inductance element is provided on the positive electric path. However, the inductance element may be provided on the negative electric path. In addition, the inductance element is provided between the short-circuit current interruption unit 21 and the reverse current interruption unit 22, but may be provided at any position as long as the position is on the electric path inside the DC distribution panel.

Embodiment 4

Figure 7:
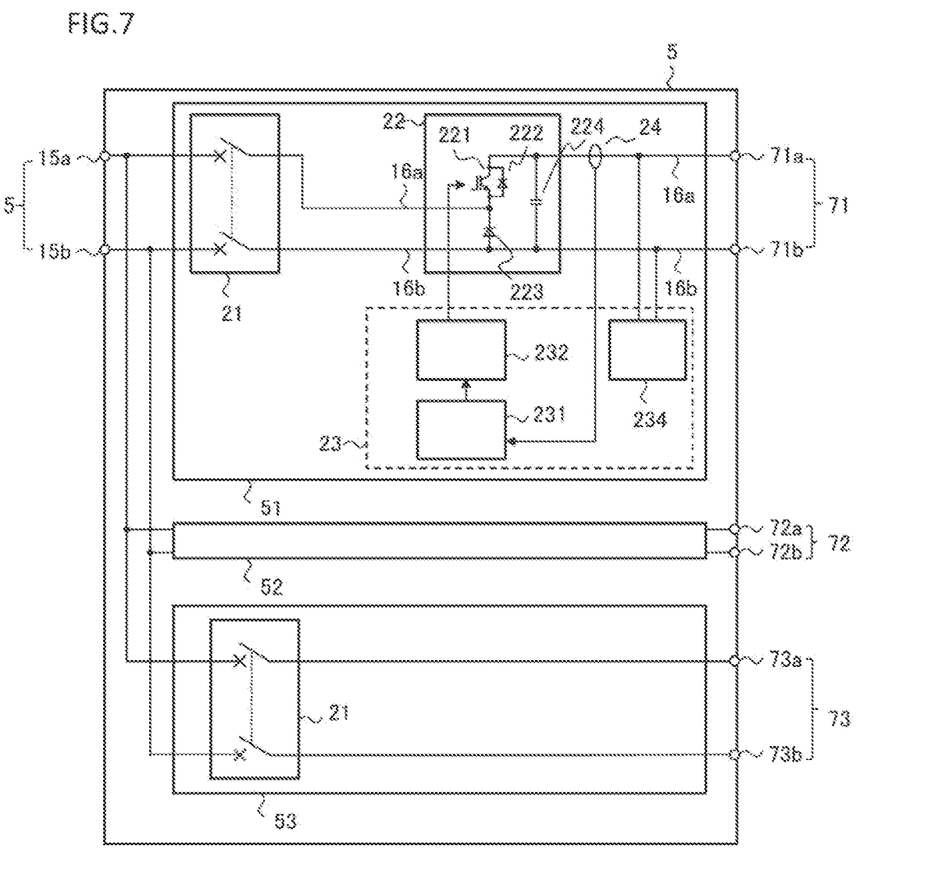
FIG. 7 is a schematic diagram of a DC distribution panel according to embodiment 4.

In the DC distribution panel of embodiment 1, all the three circuit breakers have the short-circuit current interruption units and the reverse current interruption units. In a DC distribution panel according to embodiment 4, the circuit breaker corresponding to the feeder that does not need the reverse current interruption unit has only the short-circuit current interruption unit.

FIG. 7 is a schematic diagram of the DC distribution panel according to the present embodiment. In the DC distribution panel 5 of the present embodiment, among the three circuit breakers provided, the circuit breaker 53 has only the short-circuit current interruption unit 21 and does not have the reverse current interruption unit.

Figure 8:
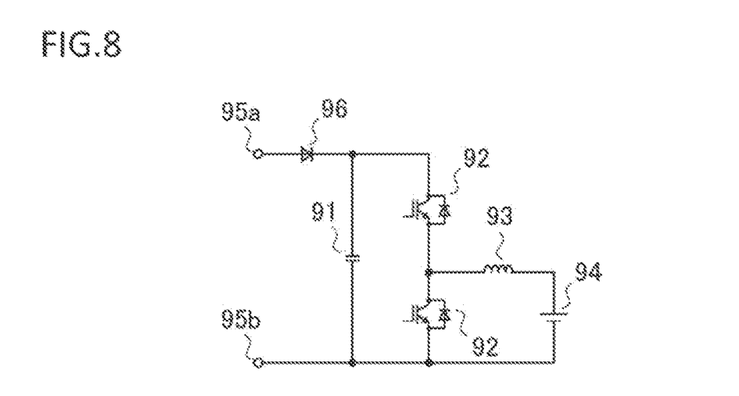
FIG. 8 is a configuration diagram of a load apparatus according to embodiment 4.

FIG. 8 is a configuration diagram of the load apparatus connected to the output terminal 73 of the circuit breaker 53. The load apparatus shown in FIG. 8 is the same as the power storage equipment shown in FIG. 4 in the above embodiment, but has a reverse flow prevention diode 96 provided between the input terminal 95*a* and the capacitor 91. The reverse flow prevention diode 96 is provided for preventing reverse flow of discharge current from the capacitor 91 to the feeder side. Such a reverse flow prevention diode can be used in an apparatus such as lighting equipment that does not have a regeneration function.

In a case where the load apparatus having such a reverse flow prevention diode is connected to the output terminal 73, for example, even when short-circuit has occurred in the load apparatus connected to the output terminal 71, reverse current does not flow into the DC distribution panel 5 from the load apparatus connected to the output terminal 73. Therefore, the circuit breaker 53 corresponding to the output terminal 73 need not have the reverse current interruption unit.

In the DC distribution panel configured as described above, as in embodiment 1, the reverse current interruption unit is provided for interrupting reverse current that flows through the positive electric path inside the circuit breaker from the output terminal side to the input terminal side. Thus, only the feeder where short-circuit current has occurred is interrupted, and operations of the load apparatuses connected to normal feeders can be continued.

In addition, the circuit breaker corresponding to the feeder where reverse current does not occur has only the short-circuit current interruption unit and does not have the reverse current interruption unit. Therefore, it is possible to realize the DC distribution panel with a small size and at low cost.

Although the disclosure is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations to one or more of the embodiments of the disclosure.

It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

DESCRIPTION OF THE REFERENCE CHARACTERS

1 DC power distribution system
2 AC power supply
3 AC/DC converter
5 DC distribution panel
15 input terminal
16*a* positive electric path
16*b* negative electric path
21 short-circuit current interruption unit
22 reverse current interruption unit
23 control circuit
24 current sensor
25 inrush current prevention unit
26 voltage sensor
27 inductance element
41, 42, 43 feeder
51, 52, 53 circuit breaker
61, 62, 63 load apparatus
71, 72, 73 output terminal
81 short-circuit current
82, 83 reverse current
91 capacitor
92 semiconductor switching element
93 inductance element
94 storage battery
95*a*, 95*b* input terminal
96 reverse flow prevention diode

The invention claimed is:

1. A DC distribution panel comprising:
an input terminal including a positive input terminal and a negative input terminal;
a plurality of circuit breakers having short-circuit current interruption circuits provided to at least either of positive electric paths and negative electric paths respectively branched from the positive input terminal and the negative input terminal; and
output terminals including positive output terminals and negative output terminals of the plurality of circuit breakers, wherein
at least one of the plurality of circuit breakers includes a reverse current interruption circuit for interrupting reverse current flowing through the positive electric path from the output terminal side to the input terminal side, wherein
the reverse current interruption circuit has
a semiconductor switching element,
a first diode connected in antiparallel to the semiconductor switching element, a second diode connected in series to the semiconductor switching element, and
a capacitor connected in parallel with the series connection of the semiconductor switching element and the second diode.

2. The DC distribution panel according to claim 1, wherein
the circuit breaker has an inrush current prevention circuit on at least either of the positive electric path and the negative electric path.

3. The DC distribution panel according to claim 1, wherein
the circuit breaker has an inductance element on at least either of the positive electric path and the negative electric path.

4. The DC distribution panel according to claim 1, wherein
the circuit breaker has
a current sensor for detecting a value of current flowing through the positive electric path or the negative electric path inside the circuit breaker,
a determination circuit for determining whether the reverse current has occurred by comparing the current value detected by the current sensor with a predetermined current threshold, and
a gate drive circuit for turning off the semiconductor switching element when the determination circuit determines that the reverse current has occurred.

5. The DC distribution panel according to claim 1, wherein
the circuit breaker has an inrush current prevention circuit on at least either of the positive electric path and the negative electric path, and
the inrush current prevention circuit is composed of a resistor and a bypass switch connected in parallel to the resistor.

6. The DC distribution panel according to claim 1, wherein
the circuit breaker has an inductance element on at least either of the positive electric path and the negative electric path, and
an inductance value of the inductance element is set to such a value as to satisfy a condition that a value of current flowing through the semiconductor switching element is smaller than a maximum current value in a reverse bias safe operating area of the semiconductor switching element.

7. The DC distribution panel according to claim 2, wherein
the circuit breaker has an inductance element on at least either of the positive electric path and the negative electric path.

8. The DC distribution panel according to claim 4, wherein
the circuit breaker has a control power supply for supplying power to the current sensor, the determination circuit, and the gate drive circuit, and
drive power of the control power supply is supplied from the positive electric path and the negative electric path on the output terminal side.

9. The DC distribution panel according to claim 4, wherein
the circuit breaker has an inrush current prevention circuit on at least either of the positive electric path and the negative electric path, and
the inrush current prevention circuit is composed of a resistor and a bypass switch connected in parallel to the resistor.

10. The DC distribution panel according to claim 4, wherein
the circuit breaker has an inductance element on at least either of the positive electric path and the negative electric path, and
an inductance value of the inductance element is set to such a value as to satisfy a condition that a value of current flowing through the semiconductor switching element is smaller than a maximum current value in a reverse bias safe operating area of the semiconductor switching element.

11. The DC distribution panel according to claim 5, wherein
a resistance value of the resistor is set to such a value as to satisfy a condition that a value of current flowing through the first diode is smaller than a rated current value of the first diode.

12. The DC distribution panel according to claim 8, wherein
the circuit breaker has an inrush current prevention circuit on at least either of the positive electric path and the negative electric path, and
the inrush current prevention circuit is composed of a resistor and a bypass switch connected in parallel to the resistor.

13. The DC distribution panel according to claim 8, wherein
the circuit breaker has an inductance element on at least either of the positive electric path and the negative electric path, and
an inductance value of the inductance element is set to such a value as to satisfy a condition that a value of current flowing through the semiconductor switching element is smaller than a maximum current value in a reverse bias safe operating area of the semiconductor switching element.

14. The DC distribution panel according to claim 9, wherein
a resistance value of the resistor is set to such a value as to satisfy a condition that a value of current flowing through the first diode is smaller than a rated current value of the first diode.

15. The DC distribution panel according to claim 10, wherein
a resistance value of the resistor is set to such a value as to satisfy a condition that a value of current flowing through the first diode is smaller than a rated current value of the first diode.

* * * * *